(12) United States Patent
Shih et al.

(10) Patent No.: US 11,203,146 B2
(45) Date of Patent: Dec. 21, 2021

(54) VACUUM PLASTIC MOLDING MACHINE

(71) Applicant: My Yard Tech Co., Ltd., Taoyuan (TW)

(72) Inventors: Cheng-Yen Shih, Taoyuan (TW); Tzu-Hao Kuo, Taoyuan (TW)

(73) Assignee: My Yard Tech Co., Ltd., Taoyuan (TW)

( * ) Notice: Subject to any disclaimer, the term of this patent is extended or adjusted under 35 U.S.C. 154(b) by 162 days.

(21) Appl. No.: 16/519,334

(22) Filed: Jul. 23, 2019

(65) Prior Publication Data
US 2020/0070399 A1 Mar. 5, 2020

(30) Foreign Application Priority Data

Aug. 28, 2018 (TW) .................................. 107129864

(51) Int. Cl.
| | | |
|---|---|---|
| *B29C 51/18* | (2006.01) | |
| *B29C 51/42* | (2006.01) | |
| *B29C 51/10* | (2006.01) | |
| *B29C 51/08* | (2006.01) | |
| *B29C 51/38* | (2006.01) | |
| *B29C 51/26* | (2006.01) | |

(52) U.S. Cl.
CPC ............. *B29C 51/18* (2013.01); *B29C 51/10* (2013.01); *B29C 51/421* (2013.01); *B29C 51/08* (2013.01); *B29C 51/262* (2013.01); *B29C 51/38* (2013.01)

(58) Field of Classification Search
CPC ... B29C 51/262; B29C 51/421; B29C 51/425; B29C 51/18; B29C 51/20; B29C 51/22; B29C 51/082; B29C 51/38; B29C 51/105; B29C 51/10; B29C 51/08
See application file for complete search history.

(56) References Cited

U.S. PATENT DOCUMENTS

| | | | | |
|---|---|---|---|---|
| 6,142,763 | A * | 11/2000 | Lee .......................... | B29C 51/18 425/398 |
| 6,361,304 | B1 * | 3/2002 | Petersen ................ | B29C 51/262 269/114 |
| 6,382,953 | B1 * | 5/2002 | Chun .................... | B29C 51/262 425/171 |
| 7,303,386 | B1 * | 12/2007 | Kundinger ............ | B29C 51/262 271/234 |
| 7,393,202 | B1 * | 7/2008 | Slutsky .................. | B29C 51/42 425/384 |

(Continued)

*Primary Examiner* — Seyed Masoud Malekzadeh
(74) *Attorney, Agent, or Firm* — Alan D. Kamrath; Karin L. Williams; Mayer & Williams PC (57) ABSTRACT

A vacuum plastic molding machine includes a heating device, a plurality of upright posts, a carrier assembly, and a demolding mechanism. The carrier assembly includes an upper carrier and a lower carrier. The upper carrier includes an upper frame, multiple upper movement structures, at least one rotation plate, at least one driving member, and at least one linking mechanism. An adjusting space is defined between the at least one rotation plate and the at least one linking mechanism. The lower carrier includes a lower frame, multiple lower movement structures, and at least one locking tenon. The locking tenon is placed into the adjusting space. The at least one driving member is rotated to change the position of the at least one locking tenon in the adjusting space, and to adjust the distance between the upper carrier and the lower carrier.

17 Claims, 8 Drawing Sheets

(56) References Cited

U.S. PATENT DOCUMENTS

| | | | | |
|---|---|---|---|---|
| 8,393,605 | B2* | 3/2013 | Yang | B25B 5/003 |
| | | | | 269/287 |
| 9,738,028 | B2* | 8/2017 | Rayama | B29C 51/262 |
| 2001/0018080 | A1* | 8/2001 | Feil | B29C 51/38 |
| | | | | 425/405.1 |
| 2003/0235637 | A1* | 12/2003 | Domanico | B29C 33/308 |
| | | | | 425/403 |
| 2009/0104300 | A1* | 4/2009 | Hiroshi | B29C 51/38 |
| | | | | 425/110 |
| 2013/0119584 | A1* | 5/2013 | Vantrease | B29C 51/38 |
| | | | | 264/322 |
| 2013/0122130 | A1* | 5/2013 | Vantrease | B29C 51/082 |
| | | | | 425/150 |
| 2014/0096897 | A1* | 4/2014 | Katou | B29C 51/262 |
| | | | | 156/212 |
| 2015/0072040 | A1* | 3/2015 | Kim | B29C 51/26 |
| | | | | 425/403.1 |
| 2015/0343699 | A1* | 12/2015 | Rayama | B29C 51/262 |
| | | | | 425/388 |
| 2018/0162039 | A1* | 6/2018 | Cloud | B29C 51/36 |

* cited by examiner

VACUUM PLASTIC MOLDING MACHINE

BACKGROUND OF THE INVENTION

1. Field of the Invention

The present invention relates to a molding machine and, more particularly, to a vacuum plastic molding machine.

2. Description of the Related Art

A conventional vacuum plastic molding machine is used to mass-produce plastic casings for toys, plastic shells for packaging, lamp housings, beverage trays, dessert molds or the like. However, the traditional vacuum plastic molding machine is bulky and expensive, so that it cannot satisfy the requirement of fabrication. In addition, the conventional vacuum plastic molding machine has to be operated by a professional operator, such that the common user cannot operate the conventional vacuum plastic molding machine. Besides, the operator has to finely adjust the level and air-tightness of the carrier of the plastic board, has to lock the plastic board by press buttons, and has to adjust the press button according to the plastic board with different thickness, thereby greatly causing inconvenience to the operator. In the conventional vacuum plastic molding machine, the plastic board is sandwiched between the upper bracket and the lower bracket of the carrier. The upper bracket and the lower bracket are compressed by tightening the press buttons or by pliers, so as to clamp the plastic board. The pliers are provided with screws to adjust the tension for pressing the upper bracket and the lower bracket, so as to fit plastic boards of different thickness. However, when the thickness the plastic board is changed, the operator has adjust the level of the pliers and the carrier, such that the plastic board is clamped between the upper bracket and the lower bracket exactly. Thus, the operator cannot operate the carrier easily and conveniently. Further, the carrier is provided with a linear slide track or a straight bearing such that the carrier slides on the linear slide track smoothly. However, the linear slide track has a larger volume, thereby increasing the cost of production, and thereby causing inconvenience in maintenance. Further, the conventional vacuum plastic molding machine is adjusted to fit plastic boards of different sizes by using a process of reducing window. However, the size of the plastic board is restricted, and the cost is higher.

BRIEF SUMMARY OF THE INVENTION

The primary objective of the present invention is to provide a vacuum plastic molding machine that is adjusted to fit plastic boards of different thickness and different sizes.

In accordance with the present invention, there is provided a vacuum plastic molding machine comprising a heating device, a plurality of upright posts, a carrier assembly, and a demolding mechanism. The heating device includes a heating module and a plurality of mounting portions arranged on a periphery of the heating module. The upright posts are mounted on the mounting portions of the heating device. The carrier assembly includes an upper carrier and a lower carrier. The upper carrier includes an upper frame, a plurality of upper movement structures arranged on the upper frame, at least one rotation plate pivotally mounted on the upper frame, at least one driving member secured on and rotating the at least one rotation plate, and at least one linking mechanism arranged on the at least one rotation plate. An adjusting space is defined between the at least one rotation plate and the at least one linking mechanism. The upper movement structures are movably mounted on the upright posts. The lower carrier includes a lower frame, a plurality of lower movement structures arranged on the lower frame, and at least one locking tenon mounted on the lower frame and corresponding to the at least one driving member. The lower movement structures are movably mounted on the upright posts. The at least one locking tenon is placed into the adjusting space. The at least one driving member is rotated to change a position of the at least one locking tenon in the adjusting space, and to adjust a distance between the upper carrier and the lower carrier. The demolding mechanism includes a plurality of fitting portions mounted on the upright posts.

Further benefits and advantages of the present invention will become apparent after a careful reading of the detailed description with appropriate reference to the accompanying drawings.

DETAILED DESCRIPTION OF THE INVENTION

Referring to FIGS. 1-8, a vacuum plastic molding machine in accordance with the preferred embodiment of the present invention comprises a heating device 1, a plurality of upright posts 2, a carrier assembly 3, and a demolding (or mold release or stripping or ejecting) mechanism 4.

The heating device 1 includes a heating module 10 and a plurality of mounting portions 11 arranged on a periphery of the heating module 10. The upright posts 2 are mounted on the mounting portions 11 of the heating device 1. The demolding mechanism 4 includes a plurality of fitting portions 40 mounted on the upright posts 2.

The carrier assembly 3 includes an upper carrier 30 and a lower carrier 31. The upper carrier 30 includes an upper frame 300, a plurality of upper movement structures 301 arranged on the upper frame 300, at least one rotation plate (or piece) 302 pivotally mounted on the upper frame 300, at least one driving member 303 secured on and rotating the at least one rotation plate 302, and at least one linking mechanism 304 arranged on the at least one rotation plate 302. An adjusting space (or control space) 306 is defined between the at least one rotation plate 302 and the at least one linking mechanism 304. The upper movement structures 301 are movably mounted on the upright posts 2. The lower carrier 31 includes a lower frame 310, a plurality of lower movement structures 311 arranged on the lower frame 310, and at least one locking tenon 312 mounted on the lower frame 310 and corresponding to the at least one driving member 303. The lower movement structures 311 are movably mounted on the upright posts 2. The at least one locking tenon 312 is placed into the adjusting space 306. The at least one driving member 303 is rotated to change a position of the at least one locking tenon 312 in the adjusting space 306, and to adjust a distance between the upper carrier 30 and the lower carrier 31.

In the preferred embodiment of the present invention, the upper movement structures 301 and the lower movement structures 311 include a plurality of rollers 32 slidably mounted on the upright posts 2. Thus, the user slides and operates the carrier assembly 3 easily and conveniently.

In the preferred embodiment of the present invention, the lower carrier 31 further includes a bearing member 315 having two ends arranged on two opposite sides of the lower frame 310.

In the preferred embodiment of the present invention, the two opposite sides of the lower frame 310 are provided with a plurality of retaining portions 316 juxtaposed to the bearing member 315 for retaining the bearing member 315.

In the preferred embodiment of the present invention, the bearing member 315 is provided with a plurality of first claws (or needles or pins) 3150.

In the preferred embodiment of the present invention, the carrier assembly 3 further includes an adjusting unit 33 including a moving lever 330 and a positioning member 331. The moving lever 330 corresponds to the bearing member 315 and has two ends arranged on two opposite sides of the upper frame 300. The positioning member 331 is mounted on one of the two ends of the moving lever 330 and presses one of the two opposite sides of the upper frame 300.

In the preferred embodiment of the present invention, the moving lever 330 is provided with a plurality of first through holes 3300 corresponding to the first claws 3150 of the bearing member 315.

In the preferred embodiment of the present invention, the moving lever 330 has a sidewall provided with at least one locking hole 3302, and the adjusting unit 33 further includes at least one fastening member 3310 arranged on the positioning member 331 and inserted into and locked in the at least one locking hole 3302 of the moving lever 330, to position the moving lever 330 in place or allow movement of the moving lever 330.

In the preferred embodiment of the present invention, a first molding space 3103 is defined between the bearing member 315 and the lower frame 310, and a second molding space 3003 is defined between the adjusting unit 33 and the upper frame 300 and corresponds to the first molding space 3103.

In the preferred embodiment of the present invention, the demolding mechanism 4 further includes a ventilating board 42 having a size that is changed to correspond to the first molding space 3103 and the second molding space 3003.

In the preferred embodiment of the present invention, the upper carrier 30 further includes at least one magnetically attractive member 307 mounted on the upper frame 300 and attached to the heating module 10 of the heating device 1.

In the preferred embodiment of the present invention, the lower frame 310 has a periphery provided with a holder structure 3100 which is provided with a plurality of second claws (or needles or pins) 3102.

In the preferred embodiment of the present invention, the upper frame 300 has a periphery provided with a press structure 3000 corresponding to the holder structure 3100. The press structure 3000 is provided with a plurality of second through hole 3002 corresponding to the second claws 3102 of the holder structure 3100.

In the preferred embodiment of the present invention, the at least one linking mechanism 304 includes a latch (or locking plate or snap-fit plate or adjusting plate) 304b, and a torsion spring plate (or piece) 304a mounted between the at least one rotation plate 302 and the latch 304b. The adjusting space 306 is defined between the at least one rotation plate 302 and the latch 304b of the at least one linking mechanism 304. The at least one linking mechanism 304 preferably has an integral construction and is moved in concert with the at least one rotation plate 302.

In the preferred embodiment of the present invention, at least one of the lower movement structures 311 includes a brake member 313 pressing one of the upright posts 2, and a driven member 314 arranged between the brake member 313 and the at least one rotation plate 302 or the latch 304b of the at least one linking mechanism 304. The brake member 313 rubs one of the upright posts 2 to produce a friction on one of the upright posts 2.

Figure 1:
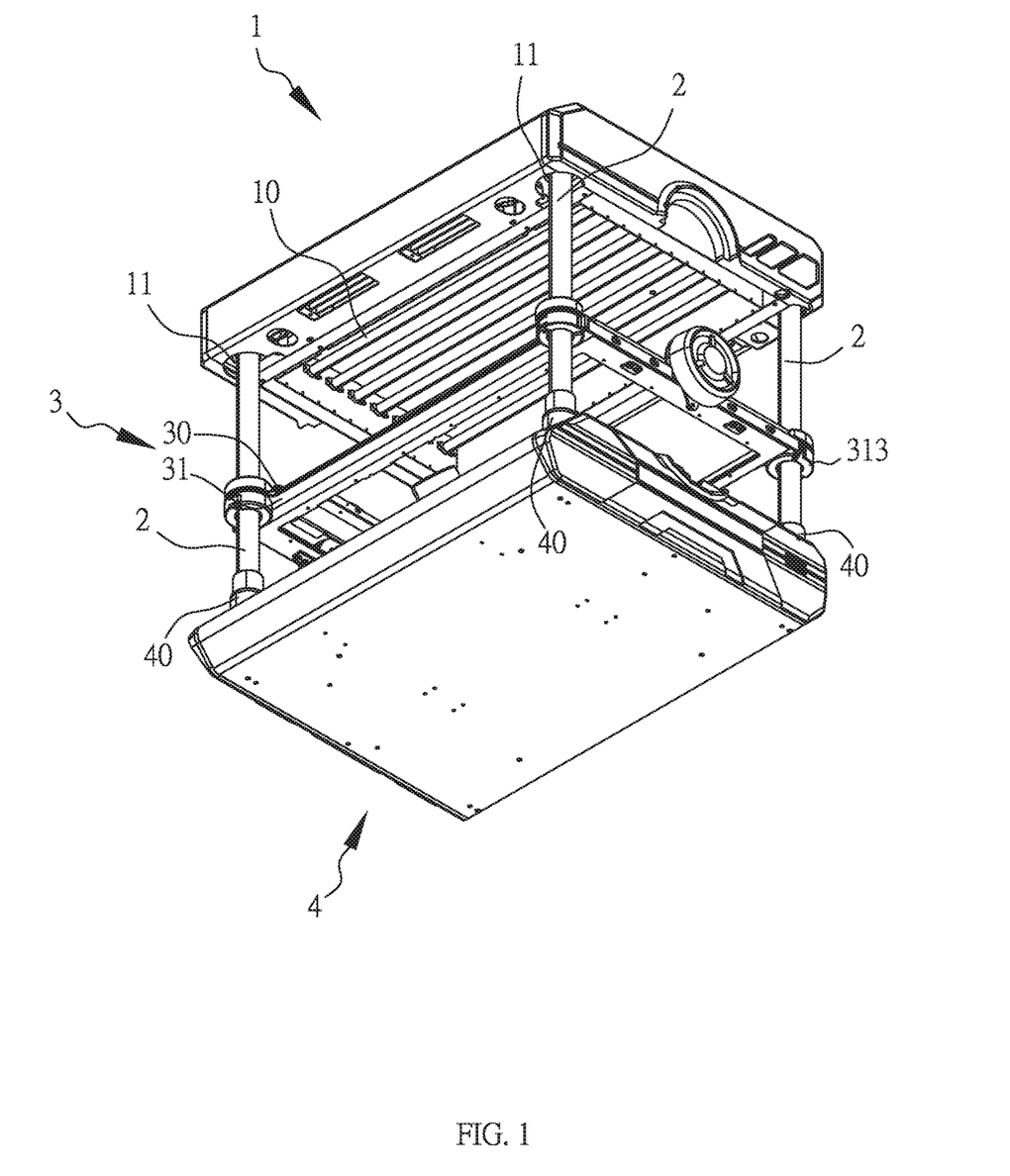
FIG. 1 is a perspective view of a vacuum plastic molding machine in accordance with the preferred embodiment of the present invention.
Figure 2:
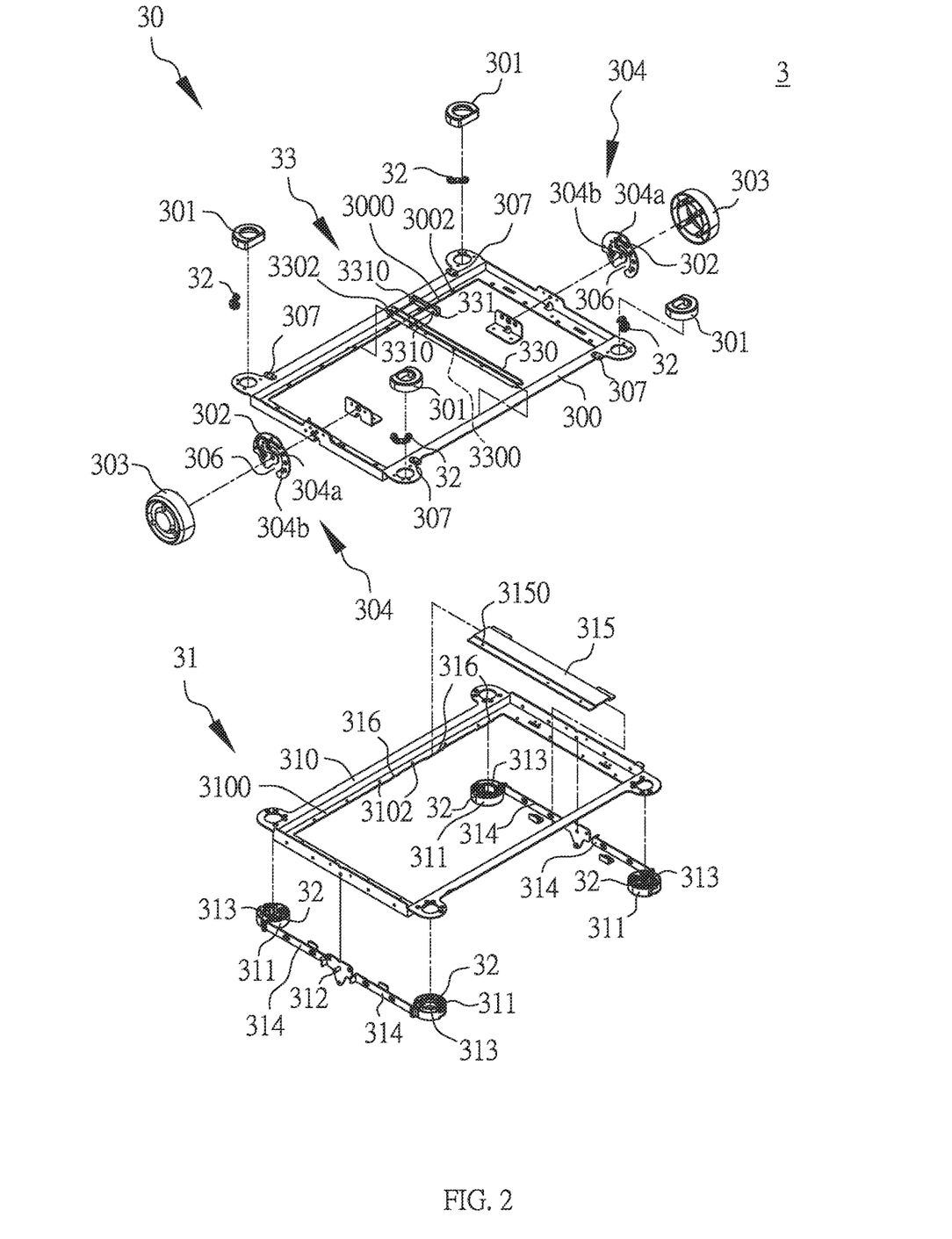
FIG. 2 is a partial exploded perspective view of the vacuum plastic molding machine in accordance with the preferred embodiment of the present invention.

In operation, referring to FIGS. 3-7 with reference to FIGS. 1 and 2, the at least one rotation plate 302 is rotated by the at least one driving member 303 to a position where the torsion spring plate 304a between the at least one rotation plate 302 and the latch 304b is disposed at a released state and does not produce a torque. In such a manner, the at least one rotation plate 302 and the latch 304b will not touch the driven member 314, and thus the driven member 314 will not push the brake member 313. At this time, the brake member 313 rubs and produces a friction on one of the upright posts 2, such that the lower frame 310 is secured on the upright posts 2. The rollers 32 of the upper movement structures 301 are slidable on the upright posts 2, such that the upper frame 300 is moved freely on the upright posts 2 and is moved relative to the lower frame 310.

Figure 3:
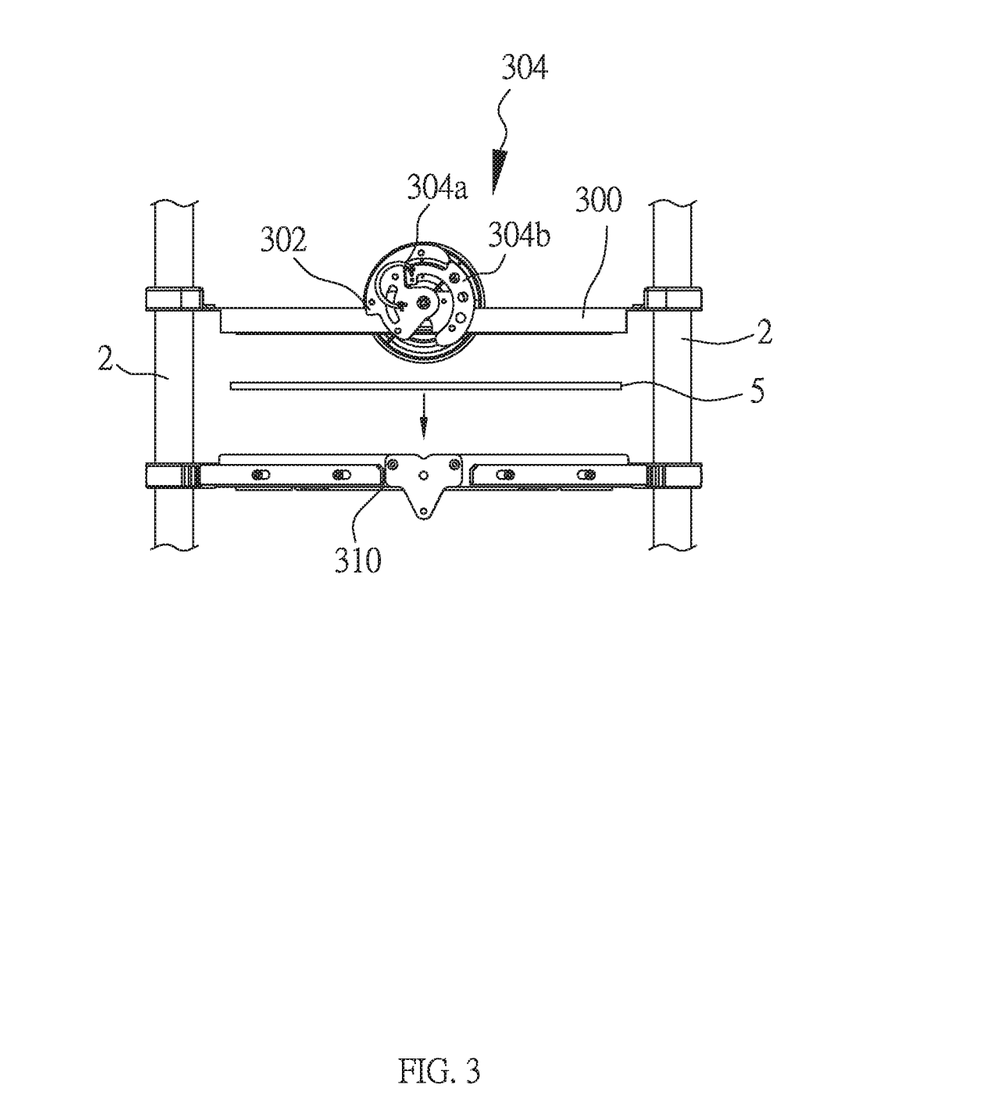
FIG. 3 is a planar operational view showing that the upper carrier is separated from the lower carrier.
Figure 4:
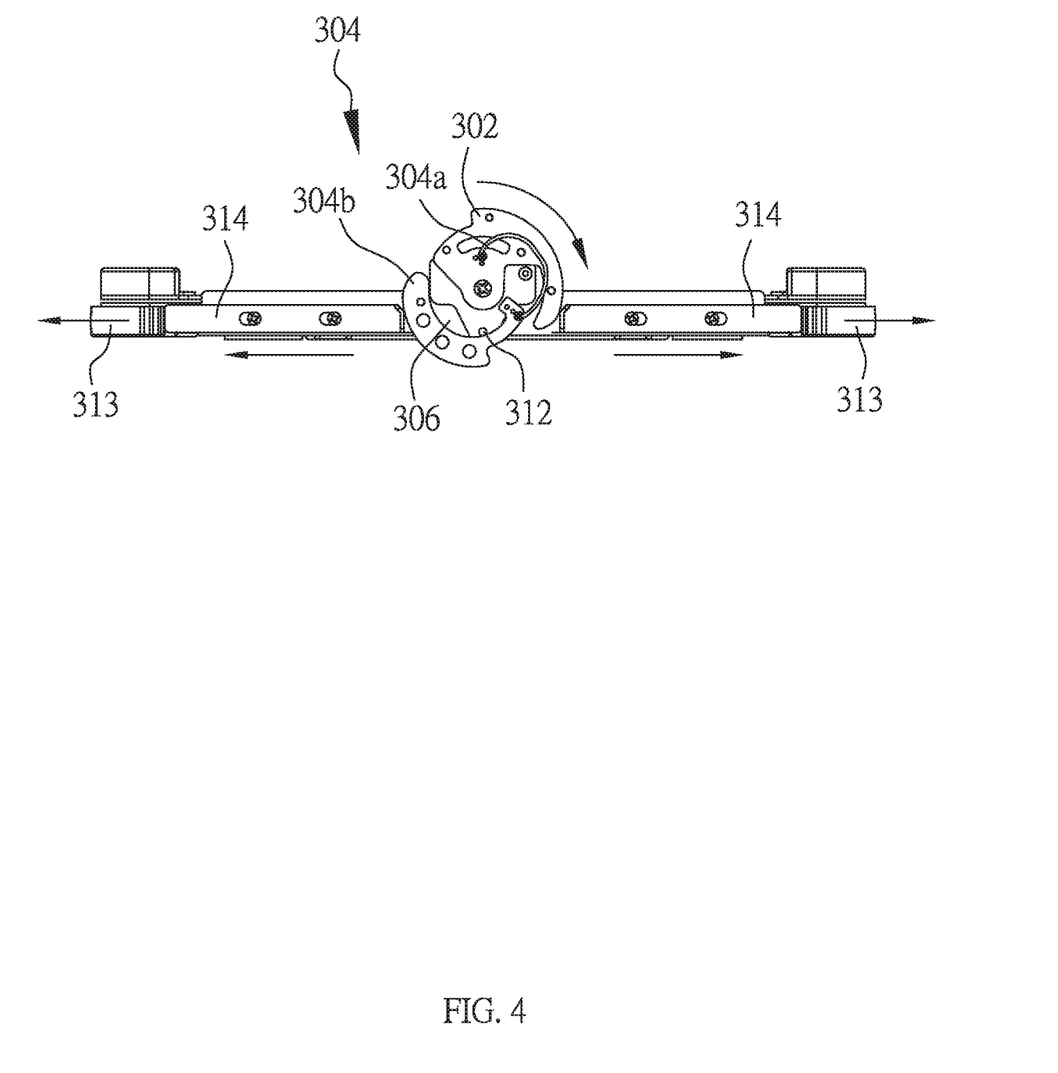
FIG. 4 is a planar operational view showing that the upper carrier is combined with the lower carrier.

When a plastic board 5 is placed on the holder structure 3100 of the lower frame 310, the second claws 3102 of the holder structure 3100 hold the plastic board 5, to prevent the plastic board 5 from slipping. Then, the upper frame 300 is moved toward the lower frame 310 as shown in FIG. 3, such that the press structure 3000 of the upper frame 300 is moved downward to press the plastic board 5, and the plastic board 5 is clamped between the upper frame 300 and the lower frame 310. When the upper frame 300 is moved to press the lower frame 310, the at least one locking tenon 312 of the lower frame 310 is placed into the adjusting space 306. Then, the user rotates the at least one driving member 303 to drive and rotate the at least one rotation plate 302 as shown in FIG. 4, and the latch 304b is rotated by driving of the torsion spring plate 304a, to change the position of the latch 304b, such that the position of the at least one locking tenon 312 in the adjusting space 306 is changed, to adjust the distance between the upper carrier 30 and the lower carrier 31, so as to fit the thickness of the plastic board 5. Thus, when the thickness of the plastic board 5 is greater, the change of the position of the latch 304b is greater. At this time, the torsion spring plate 304a presses the upper frame 300 and the lower frame 310, and limit the thickness of the plastic board 5. Thus, the upper frame 300 and the lower frame 310 are secured.

Figure 5:
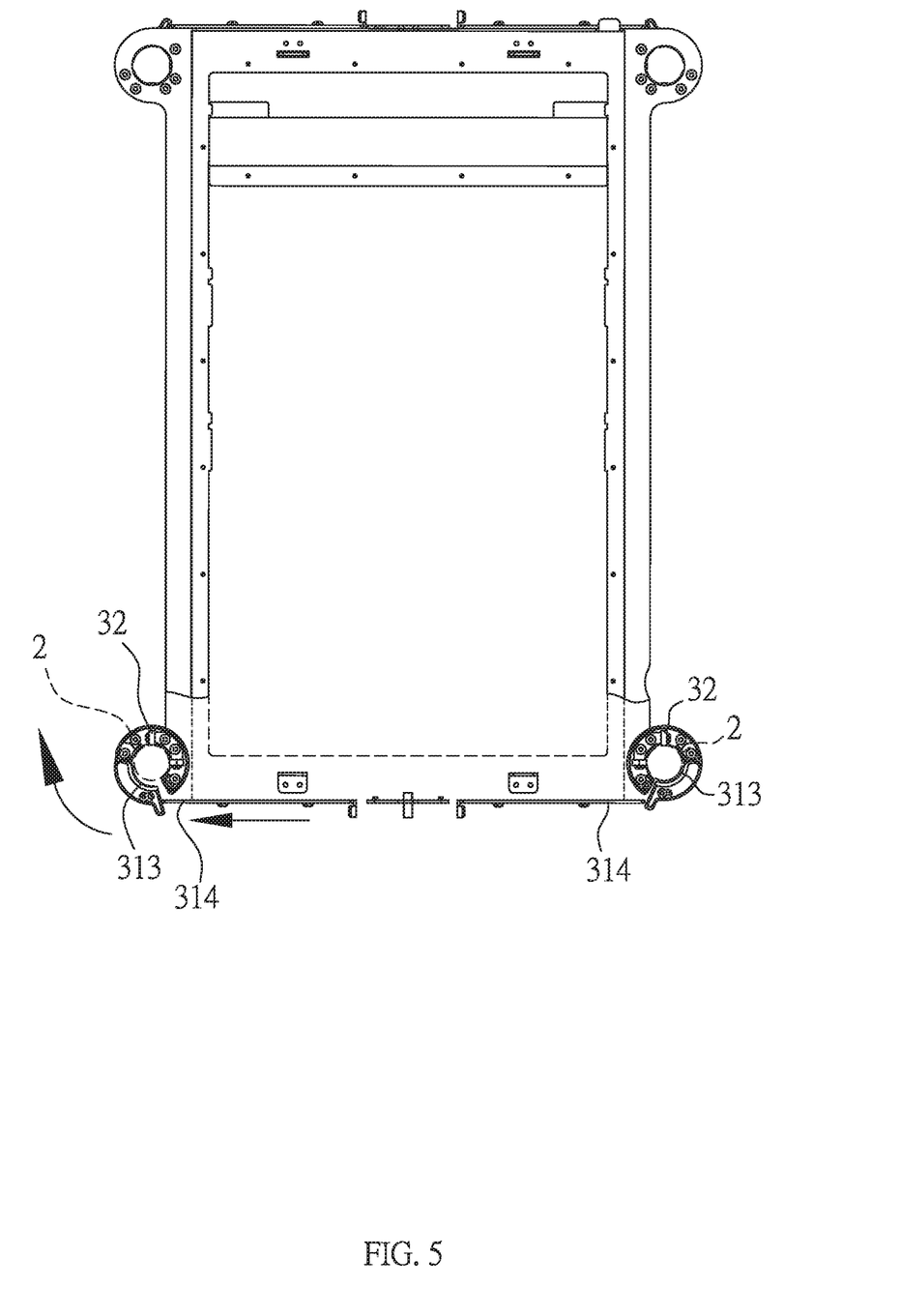
FIG. 5 is a planar operational view showing operation of a brake member.

When the at least one rotation plate 302 and the latch 304b are rotated to touch the driven member 314, the driven member 314 is pushed and moved to push the brake member 313 as shown in FIG. 4, such that the brake member 313 is detached from one of the upright posts 2 as shown in FIG. 5, to release the braking effect, thereby unlocking the lower frame 310 from the upright posts 2. Thus, the rollers 32 of the upper movement structures 301 and the lower movement structures 311 are slidable on the upright posts 2, such that the upper frame 300 and the lower frame 310 are moved freely on the upright posts 2.

As shown in FIG. 5, the brake member 313 at the right side is disposed at a locked state to correspond to the braking condition as shown in FIG. 3, and the brake member 313 at the left side is disposed at an unlocked state to correspond to the released condition as shown in FIG. 4.

Figure 6:
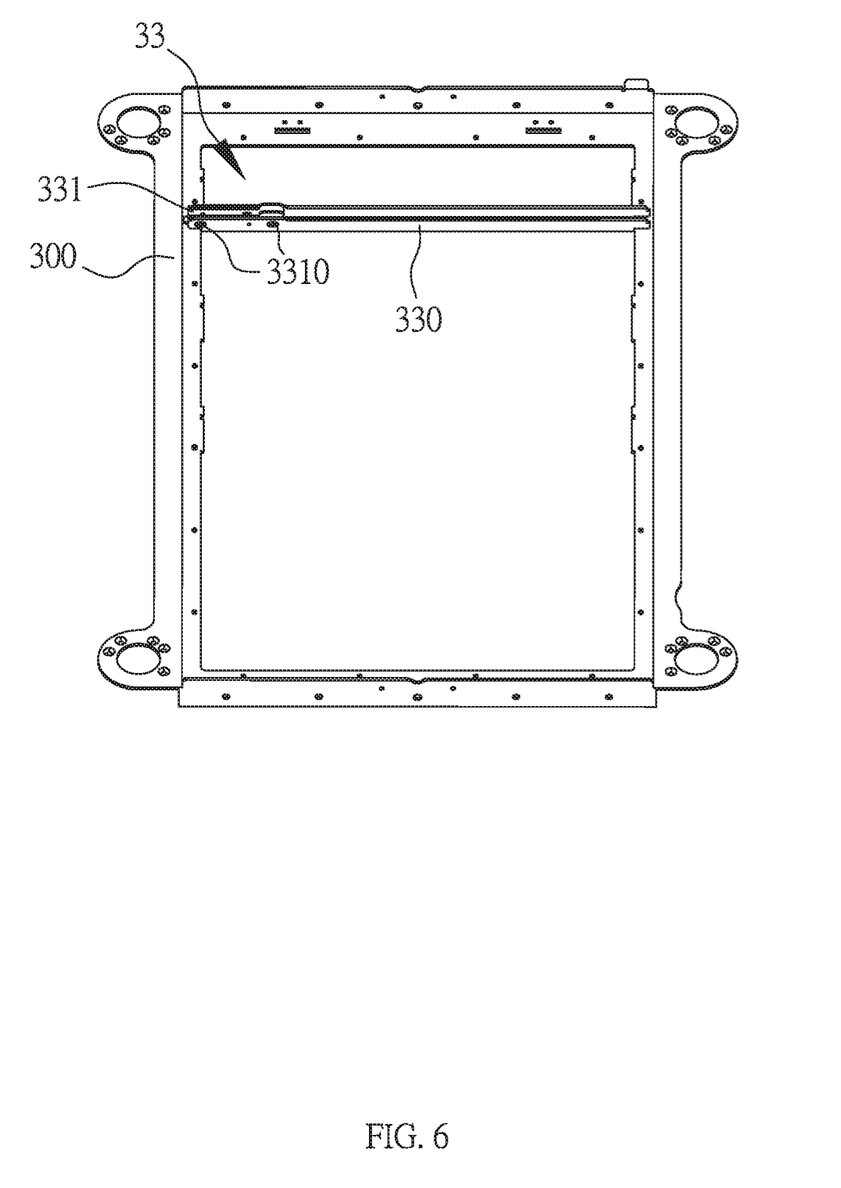
FIG. 6 is a planar view showing an adjusting unit.
Figure 7:
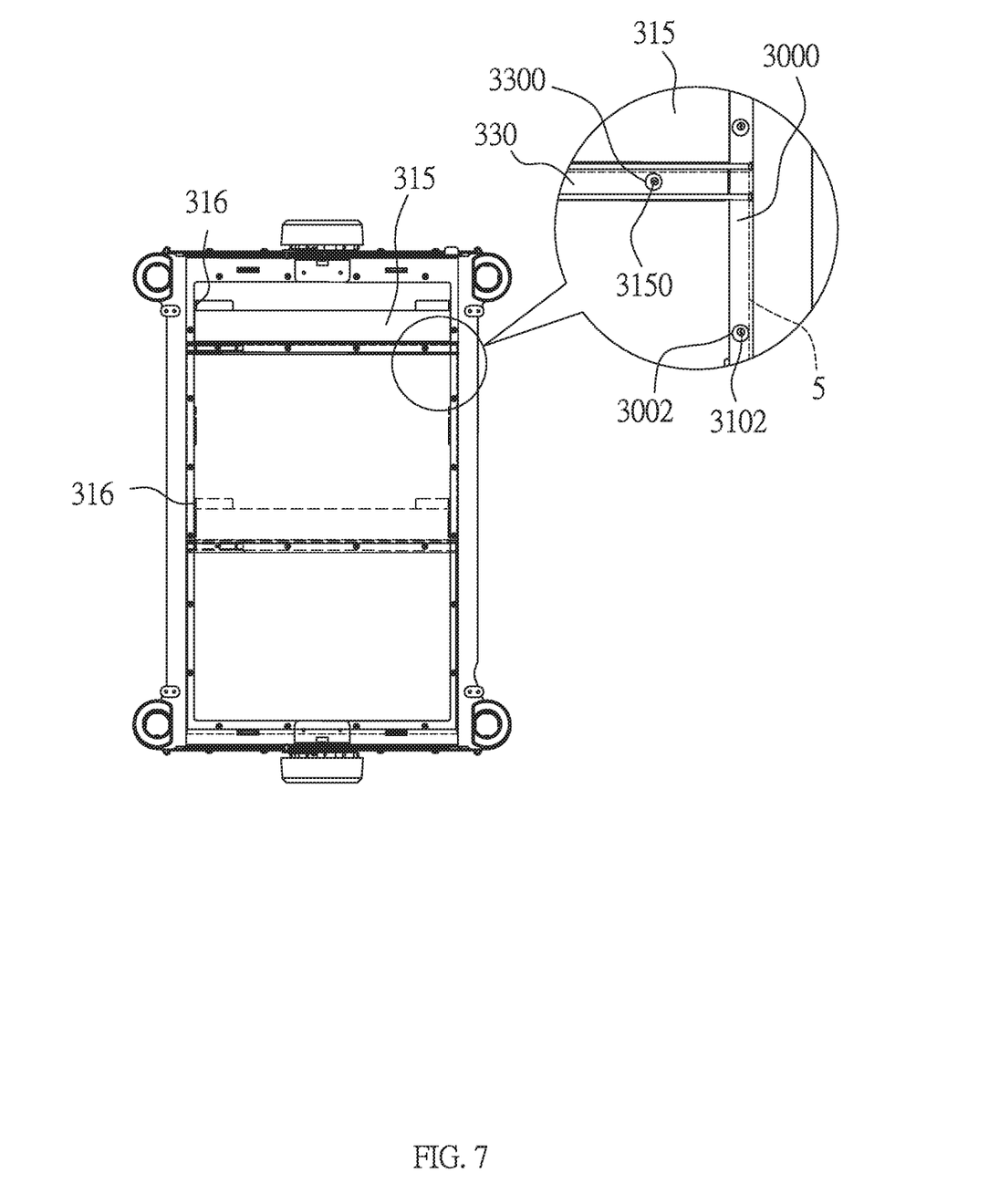
FIG. 7 is a planar view showing arrangement of the vacuum plastic molding machine for a plastic board with a different size.

As shown in FIGS. 6 and 7, when the plastic board 5 has different sizes, the user has to adjust the position of the adjusting unit 33 and the bearing member 315. The bearing member 315 is initially removed from the lower frame 310. Then, the bearing member 315 is mounted on one of the retaining portions 316 according to the size of the plastic board 5. Then, the at least one fastening member 3310 of the adjusting unit 33 is detached from the at least one locking hole 3302 of the moving lever 330, to unlock the positioning member 331, such that the positioning member 331 is moved to detach from the upper frame 300. At this time, the moving lever 330 is unlocked and moved to correspond to the position of the bearing member 315. After the position of the moving lever 330 is determined, the positioning member 331 is moved to press the upper frame 300. Then, the at least one fastening member 3310 of the positioning member 331 is locked in the at least one locking hole 3302 of the moving lever 330, to position the moving lever 330 in place. Thus, the positions of the adjusting unit 33 and the bearing member 315 are adjusted to fit the plastic board 5 with different sizes. It is noted that, the plastic board 5 is clamped between and fixed by the first claws 3150 of the bearing member 315 and the moving lever 330, thereby preventing the plastic board 5 from slipping during the plastic molding process.

Figure 8:
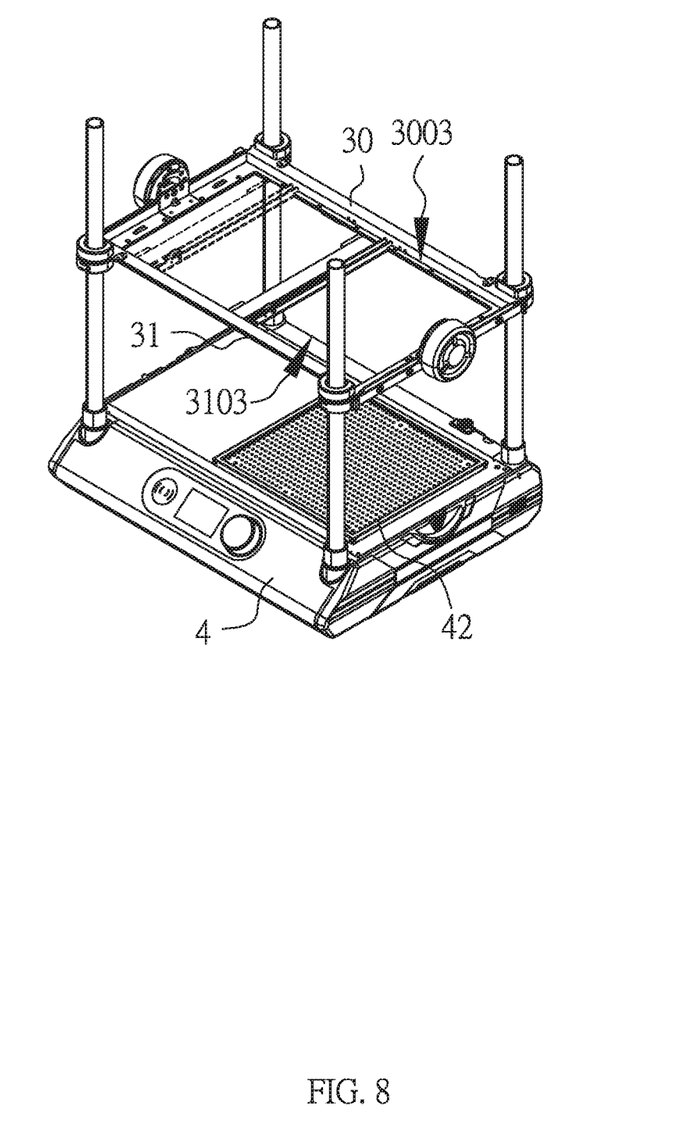
FIG. 8 is a partial perspective view of the vacuum plastic molding machine in accordance with the preferred embodiment of the present invention.

As shown in FIG. 8, the positions of the adjusting unit 33 and the bearing member 315 are adjusted when the plastic board 5 has different sizes, and the first molding space 3103 and the second molding space 3003 are also changed simultaneously. At the same time, the size of the ventilating board 42 of the demolding mechanism 4 is also changed to correspond to the dimension of the first molding space 3103 and the second molding space 3003, so as to keep an airtight effect.

In conclusion, the upper carrier 30 is provided with the at least one rotation plate 302, the at least one driving member 303, the torsion spring plate 304a, the latch 304b, and the adjusting space 306, to lock the lower carrier 31 quickly, such that the plastic board 5 is clamped between the upper carrier 30 and the lower carrier 31. In addition, the upper carrier 30 and the lower carrier 31 are moved freely on the upright posts 2 by provision of the upper movement structures 301 and the lower movement structures 311. Further, the lower carrier 31 is locked on the upright posts 2 by locking of the brake member 313 of at least one of the lower movement structures 311 after the upper carrier 30 and the lower carrier 31 are separated from each other. On the contrary, the lower carrier 31 is unlocked from the upright posts 2 by unlocking of the brake member 313 of at least one of the lower movement structures 311 after the upper carrier 30 and the lower carrier 31 are combined, such that the carrier assembly 3 is moved freely on the upright posts 2, to facilitate the user operating the carrier assembly 3.

Accordingly, the upper carrier 30 and the lower carrier 31 are clamped by cooperation of the at least one rotation plate 302, the at least one driving member 303, the torsion spring plate 304a, the latch 304b, and the adjusting space 306, such that the carrier assembly 3 is operated easily and quickly. In addition, the distance between the upper carrier 30 and the lower carrier 31 is adjusted to fit the thickness of the plastic board 5, by cooperation of the at least one rotation plate 302, the at least one driving member 303, the torsion spring plate 304a, the latch 304b, and the adjusting space 306, without having to use a conventional adjusting method, such that the user adjusts the distance between the upper carrier 30 and the lower carrier 31 easily and conveniently. Further, the carrier assembly 3 is heated and increases its temperature during the heating process, and the user only needs to rotate the at least one driving member 303 to adjust the distance between the upper carrier 30 and the lower carrier 31, and does not need to operate the carrier assembly 3, such that the user will not directly touch the carrier assembly 3 during operation, thereby preventing the user from being scalded by the carrier assembly 3. Further, the user only needs to place and change the position of the adjusting unit 33 and the bearing member 315 so as to fit the plastic board 5 with different sizes, thereby increasing the working efficiency. Further, the rollers 32 facilitate movement of the upper movement structures 301 and the lower movement structures 311 and occupy a smaller space. Further, the lower carrier 31 is located at any height by cooperation of the brake member 313 and the driven member 314, thereby facilitating the user adjusting the position of the lower carrier 31.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A vacuum plastic molding machine comprising:
 a heating device, a plurality of upright posts, a carrier assembly, and a demolding mechanism;
 wherein:
 the heating device includes a heating module and a plurality of mounting portions arranged on a periphery of the heating module;
 the upright posts are mounted on the mounting portions of the heating device;
 the carrier assembly includes an upper carrier and a lower carrier;
 the upper carrier includes an upper frame, a plurality of upper movement structures arranged on the upper frame, at least one rotation plate pivotally mounted on the upper frame, at least one driving member secured on and rotating the at least one rotation plate, and at least one linking mechanism arranged on the at least one rotation plate;
 an adjusting space is defined between the at least one rotation plate and the at least one linking mechanism;
 the upper movement structures are movably mounted on the upright posts;
 the lower carrier includes a lower frame, a plurality of lower movement structures arranged on the lower frame, and at least one locking tenon secured on the lower frame and corresponding to the at least one driving member;

the lower movement structures are movably mounted on the upright posts;

the at least one locking tenon is placed into the adjusting space;

the at least one driving member is rotated to change a position of the at least one locking tenon in the adjusting space, and to adjust a distance between the upper carrier and the lower carrier;

the demolding mechanism includes a plurality of luting portions mounted on the upright posts;

the lower carrier further includes a bearing member having two ends removably arranged on two opposite sides of the lower frame;

the carrier assembly further includes an adjusting unit including a moving lever and a positioning member;

the moving lever corresponds to the bearing member and has two ends removably arranged on two opposite sides of the upper frame;

the positioning member is pivotally mounted on one of the two ends of the moving lever and presses one of the two opposite sides of the upper frame; and at least one of the lower movement structures includes a brake member surrounding and releasably pressing one of the upright posts, and a driven member arranged between the brake member and the at least one rotation plate or a latch of the at least one linking mechanism.

2. The vacuum plastic molding machine of claim 1, wherein each of the upper movement structures has an interior provided with a plurality of rollers slidably mounted on the upright posts.

3. The vacuum plastic molding machine of claim 1, wherein each of the lower movement structures has an interior provided with a plurality of rollers slidably mounted on the upright posts.

4. The vacuum plastic molding machine of claim 1, wherein the two opposite sides of the lower frame are provided with a plurality of retaining portions retaining the hearing member.

5. The vacuum plastic molding machine of claim 1, wherein the bearing member traverses the lower frame and has a side provided with a plurality of first claws.

6. The vacuum plastic molding machine of claim 1, wherein the moving lever traverses the upper frame and is provided with a plurality of first through holes corresponding to and allowing insertion of the first claws of the bearing member.

7. The vacuum plastic molding machine of claim 1, wherein the moving lever has a sidewall provided with at least one locking hole, and the adjusting unit further includes at least one fastening member arranged on the positioning member and inserted into and releasably locked in the at least one locking hole of the moving lever, to position the moving lever in place or allow movement of the moving lever.

8. The vacuum plastic molding machine of claim 1, wherein a first molding space is defined between the bearing member and the lower frame, and a second molding space is defined between the adjusting unit and the upper frame and corresponds to the first molding space.

9. The vacuum plastic molding machine of claim 8, wherein the demolding mechanism further includes a ventilating board having a size that is changed to correspond to the first molding space and the second molding space.

10. The vacuum plastic molding machine of claim 1, wherein the upper carrier further includes at least one magnetically attractive member mounted on the upper frame and attached to the heating device to attach the upper frame to the heating device.

11. The vacuum plastic molding machine of claim 6, wherein the lower frame has a periphery provided with a holder structure which has a periphery, provided with a plurality of second claws.

12. The vacuum plastic molding machine of claim 11, wherein the upper frame has a periphery provided with a press structure corresponding to the holder structure, and the press structure is provided with a plurality of second through hole corresponding to and allowing insertion of the second claws of the holder structure.

13. The vacuum plastic molding machine of claim 1, wherein the at least one linking mechanism includes the latch pivotally mounted on the upper frame, and a torsion spring plate mounted between the at least one rotation plate and the latch, and the adjusting space is defined between the at least one rotation plate and the latch of the at least one linking mechanism.

14. The vacuum plastic molding machine of claim 1, wherein the at least one locking tenon aligns with the adjusting space, and is placed into the adjusting space when the at least one rotation plate and the at least one linking mechanism are moved to abut the at least one locking tenon.

15. The vacuum plastic molding machine of claim 1, wherein the bearing member is movable relative to the lower frame, and a position of the bearing member relative to the lower frame is adjustable.

16. The vacuum plastic molding machine of claim 1, wherein the upper frame is movable on the upright posts relative to the lower frame.

17. The vacuum plastic molding machine of claim 1, wherein the at least one rotation plate is moved with the upper frame and is movable relative to the at least one locking tenon.

* * * * *